(12) United States Patent
Jang

(10) Patent No.: US 11,496,028 B2
(45) Date of Patent: Nov. 8, 2022

(54) HAIRPIN TYPE STATOR COIL FORMING APPARATUS

(71) Applicants: Hyundai Motor Company, Seoul (KR); Kia Motors Corporation, Seoul (KR)

(72) Inventor: Seungkyu Jang, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 2 days.

(21) Appl. No.: 16/896,023

(22) Filed: Jun. 8, 2020

(65) Prior Publication Data

US 2021/0104941 A1 Apr. 8, 2021

(30) Foreign Application Priority Data

Oct. 7, 2019 (KR) .......................... 10-2019-0123902

(51) Int. Cl.
*H02K 15/04* (2006.01)
*B21D 53/00* (2006.01)

(52) U.S. Cl.
CPC ......... *H02K 15/0421* (2013.01); *B21D 53/00* (2013.01)

(58) Field of Classification Search
CPC ....................... H02K 15/0421; H02K 15/0087
See application file for complete search history.

(56) References Cited

U.S. PATENT DOCUMENTS

| | | | | |
|---|---|---|---|---|
| 7,480,987 B1* | 1/2009 | Guercioni | .......... | H02K 15/0421 29/592.1 |
| 2011/0277315 A1* | 11/2011 | Okushita | ............ | H02K 15/0478 29/736 |
| 2014/0223727 A1* | 8/2014 | Watanabe | ................ | H02K 3/12 29/602.1 |
| 2015/0381001 A1* | 12/2015 | Tsuiki | ...................... | H02K 3/28 310/208 |
| 2016/0372992 A1* | 12/2016 | Tsuiki | ...................... | H02K 1/16 |
| 2017/0019003 A1 | 1/2017 | Ponzio et al. | | |
| 2017/0353091 A1* | 12/2017 | Genmoto | .................. | B21F 3/04 |
| 2019/0190359 A1* | 6/2019 | Miyawaki | ............ | H02K 15/064 |

* cited by examiner

*Primary Examiner* — Peter Dungba Vo
*Assistant Examiner* — Jose K Abraham
(74) *Attorney, Agent, or Firm* — Slater Matsil, LLP

(57) ABSTRACT

A hairpin type of stator coil forming apparatus includes a first forming machine configured to form a vertex in a material coil so that a central portion of the material coil protrudes upward, and to form inclined portions inclined to both sides of the vertex, a second forming machine configured to receive the material coil bent-formed by the first forming machine and to form a front/rear bent portion in the material coil by bending one inclined portion and a portion of the other inclined portion based on the vertex, and a third forming machine configured to receive the material coil bent-formed by the second forming machine and to roundly form the inclined portions in front and rear directions.

11 Claims, 15 Drawing Sheets

HAIRPIN TYPE STATOR COIL FORMING APPARATUS

CROSS-REFERENCE TO RELATED APPLICATIONS

This application claims priority to Korean Patent Application No. 10-2019-0123902, filed in the Korean Intellectual Property Office on Oct. 7, 2019, which application is hereby incorporated herein by reference.

TECHNICAL FIELD

The present invention relates to a hairpin type stator coil forming apparatus and a forming method thereof.

BACKGROUND

Generally, a hybrid vehicle or an electric vehicle called an environmentally-friendly vehicle may generate driving force by an electric motor (hereinafter referred to as a "driving motor") that obtains rotational power from electrical energy.

The hybrid vehicle may be driven in an electric vehicle (EV) mode, which is a pure electric vehicle mode that uses only the power of the driving motor, or in a hybrid electric vehicle (HEV) mode, which uses rotational power of both an engine and the driving motor as a power source.

In addition, a general electric vehicle travels using the rotational force of the driving motor as a power source.

For example, most of the driving motors used as the power source of the environmentally-friendly vehicle are permanent magnet synchronous motors (PMSMs).

As such, the driving motor as a permanent magnet synchronous motor used as a power source for an environmentally-friendly vehicle basically includes a stator generating a magnetic flux, a rotor that is spaced apart from the stator by a predetermined gap and performs rotational movement, and a permanent magnet installed at the rotor.

Here, the stator is provided with a plurality of slots formed at an inner circumferential side of a stator core, and a stator coil is wound in each slot.

When an alternating current is applied to the stator coil, a rotating magnetic field is generated in the stator, and rotation torque may be generated in the rotor by the rotating magnetic field.

The driving motor may be classified into a distributed winding type of driving motor and a centralized winding type of driving motor according to a winding method of the stator coil, and a stator of the distributed winding type of driving motor may be classified into a segment coil stator and a distributed winding coil stator according to a coil winding method.

In this case, the segment coil stator is a stator made by a method in which a coil is previously formed in a predetermined shape and then inserted into a slot of the stator core, and the distributed winding coil stator is a stator made by a method of inserting a bundle of coils into the slot of the stator core.

Meanwhile, an output of the driving motor is known to be proportional to the number of turns of the coil wound on the stator core.

However, when the number of turns of the coil is increased, a size of the stator core or driving motor inevitably increases, which makes it difficult to downsize the driving motor.

Therefore, a method of increasing a stacking factor of the coil wound on the stator core may be considered in order to improve the output of the driving motor without increasing the size of the driving motor.

In other words, a method of increasing the stacking factor of the coil by minimizing a dead space between the stator core and the winding coil or a dead space between respective coils may be considered.

In the above aspect, in place of using a ring-shaped coil (referred to as "ring-shaped wire" in the art) having a circular section as a coil winding, a method of using a flat coil (referred to as "flat wire" in the art) having a square section has been actively studied.

The flat coil may reduce the dead space and improve the stacking factor due to a shape of a section thereof as compared with the ring-shaped coil.

However, the flat coil has a difficulty in coil winding work as compared with the ring-shaped coil.

This is because the flat coil is manufactured to have a wide cross-section as compared with the ring shaped coil in order to maximize the stacking factor so it is difficult to use a winding machine.

Accordingly, as a method of easily performing coil winding work of the flat coil in the segment stator of the distributed winding driving motor, a method in which a plurality of separate hairpin type (substantially U or V shape) of stator coils (also referred to as "conductors" in the art) are inserted into each slot of the stator core, and in which the stator coil adjacent to a radial direction in the slot is welded such that the coil winding of the stator core is continuously formed, has been proposed.

The driving motor having the stator of the hairpin winding type manufactured by the method mentioned above is also referred to as a "hairpin driving motor" in the art.

According to the structure of the stator coil winding of the above-described hairpin driving motor, it is possible to overcome limitations caused by a winding machine, and to relatively easily perform winding work even in the case of the square coil, and further, it is possible to implement a miniaturized motor with high power by increasing the stacking factor of the coil.

On the other hand, a process of forming the stator coil of the hairpin type as described above to have a predetermined shape may be substantially classified into a computer numerical control (CNC) forming method and a press forming method, and since there are several types of hairpins in one hairpin driving motor, the CNC forming method that may be applied to multiple models is advantageous.

However, according to the CNC forming method that may be applied to various models, a production speed of one hairpin is about 6 seconds, which is somewhat slow; while according to the press forming method of a fast speed, a production speed of one hairpin is about 3 seconds, which is a speed providing twice the productivity of the CNC forming method, but the press forming method may produce only a single model.

Therefore, research and development on a method for forming the hairpin is necessary.

The above information disclosed in this Background section is only for enhancement of understanding of the background of the invention, and therefore it may contain information that does not form the prior art that is already known to a person of ordinary skill in the art.

SUMMARY

The present invention relates to a hairpin type stator coil forming apparatus and a forming method thereof. Particular embodiments relate to a hairpin type stator coil forming apparatus and a forming method that may form a stator coil corresponding to multiple models.

Embodiments of the present invention provide a hairpin type of stator coil forming apparatus and forming method that may produce various types of stator coils.

An embodiment of the present invention provides a hairpin type of stator coil forming apparatus, including a first forming machine that forms a vertex so that a central portion of a material coil protrudes upward, and forms inclined portions inclined to both sides of the vertex, a second forming machine in which the material coil bent-formed by the first forming machine is loaded, and that forms a front/rear bent portion by bending one side inclined portion and a portion of the other side inclined portion based on the vertex, and a third forming machine in which the material coil bent-formed by the second forming machine is loaded, and that roundly forms the inclined portion in front and rear directions.

The first forming machine may include a lower central die configured to be provided with: a forming surface having a triangular cross-section, lower left and right dies configured to be slide-movable in left and right directions at both sides connected to the forming surface of the lower central die, and to adjust a length of the inclined portion of the material coil, a moving bracket configured to be supported through a frame at an upper portion of the lower central die, and to be movable upward and downward from an upper portion of the frame, upper spring parts configured to be disposed to be spaced apart from each other by a predetermined distance at both sides with respect to a center of the forming surface of the lower central die through the moving bracket, and to press-fit the material coil toward the lower central die so that a vertex and an inclined portion are formed on the material coil through the forming surface when the moving bracket moves downward, and upper roller parts configured to be disposed at both outer sides of the upper spring part through the moving bracket, and to adjust a length of the inclined portion by press-fitting the material coil based on the lower left and right dies.

The lower central die may include an upper portion provided with a forming surface for forming the inclined portion and the vertex on the material coil, and both sides formed with mounting grooves on which the lower left and right dies are mounted.

The lower left and right dies may be mounted to be slidably moved in left and right directions by operations of motors in the mounting grooves.

The moving bracket may be mounted on a screw rotated by the motor installed in the frame to be movable in up and down directions, and its moving position is limited by a stopper disposed in a lower end portion of the screw.

The upper spring part may include a spring mounted in a catching hole formed on the moving bracket, a spring rod disposed inside the spring to be installed through an upper portion of the frame, and a spring block that is connected to an end of the spring rod and press-fits the material coil toward the lower central die as the moving bracket moves downward.

The upper roller part may include a supporting rod mounted on the moving bracket, and a roller that is rotatably mounted on a front end of the supporting rod to bend and press-fit the material coil toward the lower left and right dies as the moving bracket moves downward.

The first forming machine may further include a cutting part that cuts the material coil by a set length in a rear direction in which the material coil is supplied, wherein the cutting part may include a cutting die disposed under the material coil, and a cutter disposed at an upper side corresponding to the cutting die to be driven in up and down directions.

The second forming machine may include upper and lower molds in which the vertex and the inclined portion of the material coil formed by the first forming machine are interposed, and step surfaces that form the front/rear bent portion by forming the vertex so that one side inclined portion and the other side inclined portion are positioned on different lines based on the vertex of the material coil, and may be formed on opposite inner surfaces of the upper and lower molds, respectively.

The third machine may include clamping parts respectively disposed corresponding to both ends of the inclined portion of the material coil formed by the second forming machine so that the inclined portion is clamped through clamping pins.

The clamping part may include a first clamping part that is movable forward and backward based on a center of the rack gear by a guider while clamping one side of the inclined portion, and a second clamping part that is mounted to rotate with the rack gear rotating by a pinion gear and rotates in one direction with respect to the fixed first clamping part while clamping the other side of the inclined portion.

The clamping part may be configured so that the material coil rotates in a clamped state by the clamping pin to adjust a round angle of the inclined surface.

Another embodiment of the present invention provides a hairpin type of stator coil forming method that forms a hairpin type stator coil including a front/rear bent portion formed at a vertex by bending and forming a material coil, inclined portions that are inclined downward from the front/rear bent portion to both sides and are rounded in front and rear directions, and leg portions connected downwardly to the inclined portions, by using a hairpin type stator coil forming apparatus, the method including a first step of cutting the material coil by a first forming machine by a predetermined length and forming a vertex and an inclined portion on the material coil, a second step of loading the vertex and the inclined portion so as to be interposed between an upper mold and a lower mold, and forming the vertex front/rear bent portion so that one inclined portion and the other inclined portion are positioned on different lines based on the vertex by combining the upper and lower molds, and a third step of loading both ends of the inclined portion so as to be interposed between clamping pins and rotating a clamping part to form the inclined portion rounded forward and backward.

The first step may include entering the material coil into an upper portion of a lower central die, cutting the material coil by a cutting part disposed at a rear side of an entry direction of the material coil, forming a vertex and an inclined portion on the material coil along a forming surface by moving a moving bracket downward such that a spring part press-fits the material coil to the forming surface of the lower central die, and continuously moving the moving bracket downward, so that an upper roller part press-fits the material coil along lower left and right dies.

The first step may further include moving the lower left and right dies in left and right directions to be loaded at a predetermined position when the upper roller part moves downward to press-fit the material coil toward the lower left and right dies.

The second step may include, loading the material coil so that the vertex and the inclined portion are interposed between upper and lower molds, after the first step, and forming the vertex into a front/rear bent portion so that one inclined portion and the other inclined portion are positioned on different lines based on the vertex by combining the upper and lower molds.

The third step may include loading the material coil so that both ends of the inclined portion are interposed between clamping pins, after the second step, and forming the inclined portion of the material coil to be rounded forward and backward by rotating the second clamping part in one direction with respect to a first clamping part in a state in which the material coil is clamped by the clamping pins.

The first clamping part may be driven along a guider in a direction closer to or further away from the second clamping part.

In the third step, an amount of the inclined portion being bent in front and rear directions may be determined according to an angle at which the first clamping part rotates.

The hairpin type of stator coil forming apparatus and forming method according to the embodiments of the present invention may change only set values inputted to a first forming machine, a second forming machine, and a third forming machine to set lengths of inclined portions of a material coil, an angle of a vertex between the inclined portions, a bent degree of the inclined portion, and the like. Therefore, it is applicable to the production of various types of stator coils, and it is possible to cope with multiple models with one piece of equipment, and to improve productivity.

Further, effects that may be obtained or expected from embodiments of the present invention are directly or suggestively described in the following detailed description. That is, various effects expected from embodiments of the present invention will be described in the following detailed description.

DETAILED DESCRIPTION OF ILLUSTRATIVE EMBODIMENTS

Figure 1:
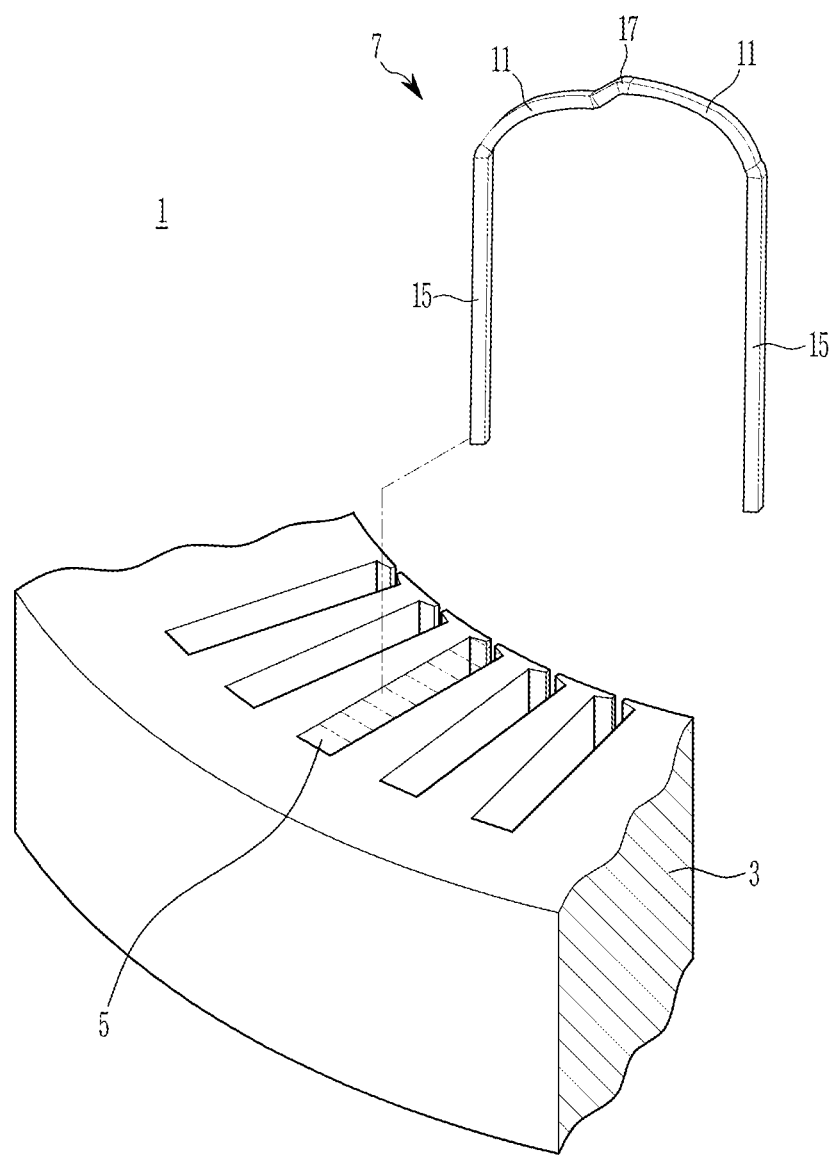
FIG. 1 illustrates a schematic view of a structure of a hairpin type stator of a driving motor applied to an embodiment of the present invention.

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

To clearly describe the embodiments of the present disclosure, portions which do not relate to the description are omitted, and like reference numerals designate like elements throughout the specification.

Further, in the following detailed description, terms of elements, which are in the same relationship, are divided into "first", "second", etc., but the embodiments of the present invention are not necessarily limited to the order in the following description.

FIG. 1 illustrates a schematic view of a structure of a hairpin type stator of a driving motor applied to an embodiment of the present invention.

Referring to FIG. 1, a hairpin type of stator of a driving motor applied to an embodiment of the present invention may be applied to a driving motor for a hybrid vehicle and/or an electric vehicle, as environmentally-friendly vehicles that obtain driving force from electrical energy.

For example, the driving motor may be applied to a permanent magnet synchronous motor (PMSM).

In the embodiments of the present invention, the driving motor includes a stator 1, a rotor (not shown) spaced apart from the stator 1 by a predetermined gap, and a plurality of permanent magnets (not shown) installed on the rotor.

The stator 1 includes a stator core 3 in which a plurality of electrical steel sheets are stacked, and a hairpin type of stator coil 7 (generally referred to as a "conductor" in the art) is wound on the stator core 3 through a plurality of slots 5.

In addition, the rotor includes a rotor core in which a plurality of electrical steel sheets are stacked in an axial direction.

The permanent magnet mentioned above is inserted into and installed in insertion holes provided in the rotor core.

Here, the driving motor may be applied to an inner-type synchronous motor having a rotor disposed inside the stator 1, or may be applied to an outer-type synchronous motor having a rotor disposed outside the stator 1.

The hairpin type of stator coils 7 described above are flat wire coils, and for example, the hairpin type of stator coil 7 includes a front/rear bent portion 17 formed in a central portion thereof, inclined portions 11 formed downward at both sides based on the front/rear bent portion 17, and leg portions 15 formed vertically below respective inclined portions 11, its overall shape is a hairpin shape in which a U shape or V shape is disposed upside down, and it is a flat coil with a quadrangular cross-section.

In this case, in the stator coil 7, one inclined portion is disposed to protrude forward or backward compared to the other inclined portion based on the front/rear bent portion 17, and an overall shape of the inclined portion 11 may be rounded forward or backward.

The hairpin type of stator coils 7 are inserted into a set layer (indicated by a dashed-dotted line in the drawing) of the slot 5, and end portions of a pair of leg portions 15 protrude to are outside of the slot 5, and while the protruding portions are welded, they may form an electrically connected coil winding.

As described above, although an embodiment of the present invention in which the hairpin type of winding is the stator in the driving motor applied to the environmentally friendly vehicle has been described, the scope of the present invention is not limited thereto, and a technical scope of the present invention is applicable to any driving motor provided with various kinds and purposes of hairpin-type stators.

Figure 2:
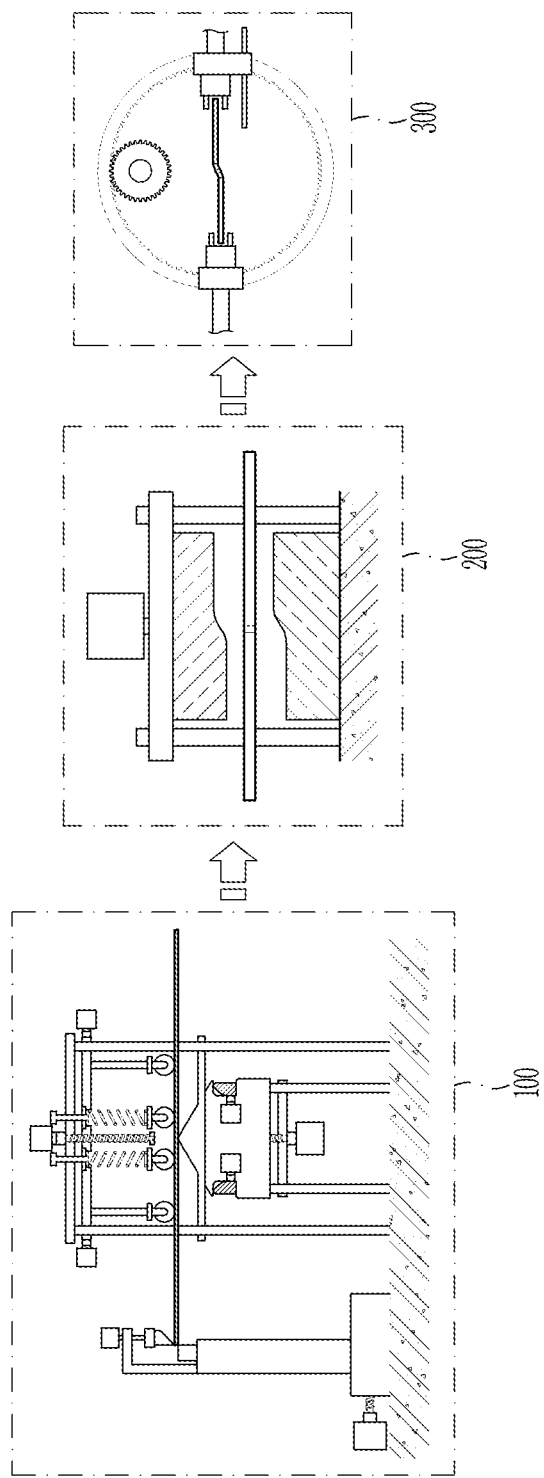
FIG. 2 illustrates a schematic view of a hairpin type of stator coil forming apparatus according to an embodiment of the present invention.

FIG. 2 illustrates a schematic view of a hairpin type of stator coil forming apparatus according to an embodiment of the present invention.

A hairpin type of stator coil forming apparatus according to an embodiment of the present invention basically includes a first forming machine 100, a second forming machine 200, and a third forming machine 300, which will be described for each configuration.

Regarding the hairpin type stator coil 7 according to an embodiment of the present invention, a straight type of material coil 10 is supplied to the first forming machine 100 to be bent in the first forming machine 100 to form the inclined portion 11, a vertex 13, and the leg portions 15. The material coil 10 formed in the first forming machine 100 is transferred to the second forming machine 200 through a transferring gripper to form the front/rear bent portion 17, and the material coil 10 formed in the second forming machine 200 is transferred to the third forming machine 300 through a transferring gripper to round the inclined portion 11, so the hairpin type stator coil 7 is finally completed.

Figure 3:
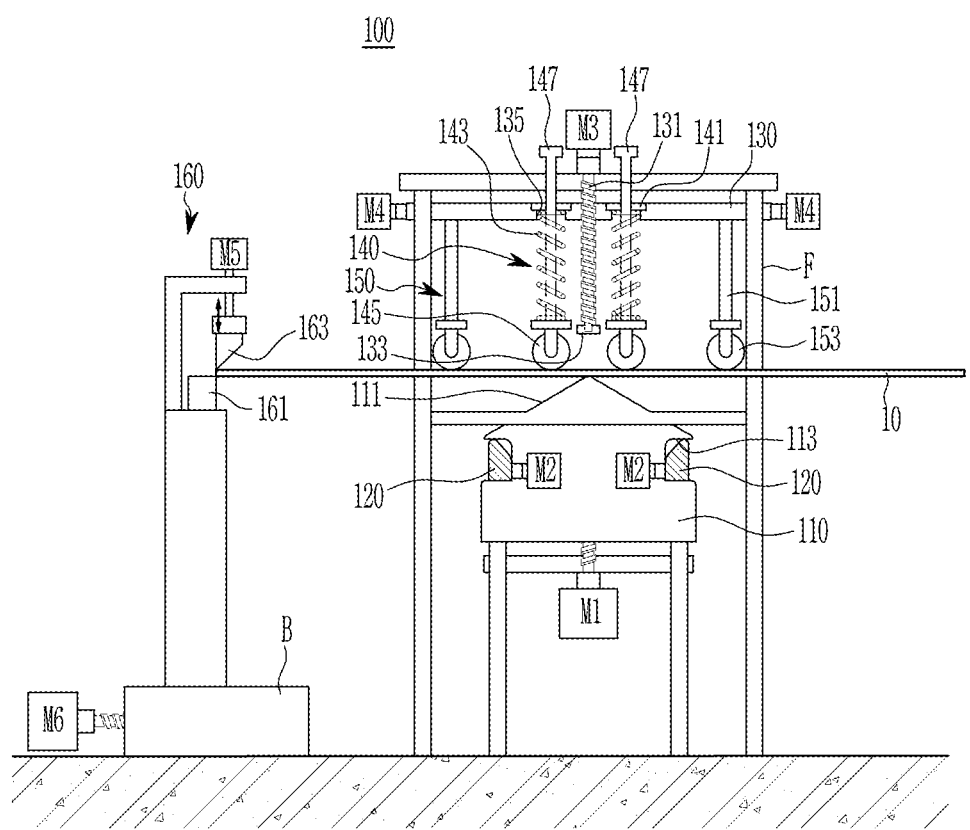
FIG. 3 illustrates a schematic view of a first forming machine applied to a hairpin type of stator coil forming apparatus according to an embodiment of the present invention.

FIG. 3 illustrates a schematic view of a first forming machine applied to a hairpin type of stator coil forming apparatus according to an embodiment of the present invention.

In the present specification, based on FIG. 3, an entry direction of the material coil 10 described below is set to the left and right directions as a reference direction, and a portion directed upward is defined as an upper portion, an upper end, an upper surface, and an upper end portion, and a portion directed downward is defined as a lower portion, a lower end, a lower surface, and a lower end portion.

In addition, hereinafter, an "end (one side end or the other end)" may be defined as any one end, or may be defined as a predetermined portion (one end portion or the other end portion) including the end.

Referring to FIG. 3, the first forming machine 100 is supplied with the straight material coil 10 from a stator coil supplying apparatus (not shown).

Briefly explaining the stator coil supplying apparatus, it unwinds the flat material coil 10 wound on a coil unwinder, flattens the material coil 10 through a coil straightener, and then supplies the flattened material coil 10 to the first forming machine 100 according to an embodiment of the present invention.

As described above, the first forming machine 100 supplied with the material coil 10 from the stator coil supplying apparatus bends and forms the material coil 10 so that a center portion of the material coil 10 protrudes to one side and forms a vertex 13 while forming the inclined portion 11.

The first forming machine 100 includes a lower central die 110, lower left and right dies 120, a moving bracket 130, an upper spring part 140, an upper roller part 150, and a cutting part 160.

The lower central die 110 is disposed corresponding to a lower center of the material coil 10.

The lower central die 110 has a forming surface 111 of which a vertically directional cross-section is a triangular cross-section.

In the lower central die 110, the forming surface 111 has a predetermined width in front and rear directions so that the material coil 10 may be seated.

The forming surface 111 is fixed to the frame F at a position excluding a portion on which the material coil 10 is seated.

The lower central die 110 is configured to form the inclined portion 11 and the vertex 13 in the material coil 10 through the forming surface in.

In addition, the lower central die 110 may be provided to be movable in up and down directions through a first motor M1 disposed at a lower side thereof.

Mounting grooves 113 are formed in both sides of the lower central die 110, and the lower left and right dies 120 are mounted on the mounting grooves 113 so as to be able to slide in left and right directions.

The mounting grooves 113 may be formed in both sides of the lower central die no connected to the forming surface in.

The lower left and right dies 120 may be mounted to be able to slide in the left and right directions by an operation of a second motor M2 in the mounting groove 113.

The lower left and right dies 120 may be guided by a separate member (not shown) that may slide and move in the mounting groove 113, for example, a roller member.

The lower left and right dies 120 may be connected to the forming surface 111 to adjust a length of the inclined portion 11 of the material coil 10 according to its movement.

For example, when the lower left and right dies 120 are moved toward respective outsides, the length of the inclined portion 11 may be formed long.

In addition, the moving bracket 130 may be disposed above the lower central die no and the lower left and right dies 120.

The moving bracket 130 may be supported through the frame F fixed to the ground.

The moving bracket 130 is installed on a screw 131 vertically disposed from an upper portion of the frame F to be vertically movable along the screw 131.

The moving bracket 130 is vertically movably mounted on the screw 131 rotated by a third motor M3 installed on the upper portion of the frame F, and its moving position may be limited by a stopper 133 disposed at a lower end portion of the screw 131.

The upper spring part 140 and the upper roller part 150 are mounted on the moving bracket 130.

The upper spring part 140 is mounted on two positions spaced apart from each other by a predetermined interval based on the center of the forming surface 111 of the lower central die 110 through the moving bracket 130.

The upper spring part 140 includes a catching end 141, a spring 143, a spring block 145, and a spring rod 147.

The catching end 141 is fitted through a catching hole 135 formed in the moving bracket 130 to fix the upper spring part 140.

The spring 143 may be connected to the catching end 141, and may be made of a material having relatively strong elasticity.

In addition, a spring rod 147 is disposed inside the spring 143, and the spring rod 147 may penetrate the moving bracket 130 to be mounted on the upper portion of the frame F.

The spring rod 147 may limit a position of the spring 143, and the spring block 145 is connected to an end portion of the spring rod 147.

The spring block 145 is a portion that directly contacts the material coil 10, and when it is press-fitted in contact with a surface of the material coil 10, it is preferable that it is made of a material that does not cause scratches or the like on the surface of the material coil 10.

The upper spring part 140 may press-fit the material coil 10 toward the lower central die 110 as the moving bracket 130 moves downward.

The upper spring part 140 may press-fit the material coil 10 toward the lower central die 110 so that the inclined portion 11 and the vertex 13 are formed on the material coil 10 along the forming surface 111 of the lower central die 110.

The moving bracket 130 is installed with upper roller parts 150, wherein the upper roller parts 150 are respectively disposed at both outer sides of the upper spring part 140.

The upper roller parts 150 can press-fit the material coil 10 together with the lower left and right dies 120 to adjust the length of the inclined portion 11 of the material coil 10.

In addition, the upper roller parts 150 may operate in a direction closer to or farther from each other through fourth motors M4 installed at both end portions of the moving bracket 130.

The upper roller part 150 includes a supporting rod 151 and a roller 153.

The supporting rod 151 is installed on the moving bracket 130, and a roller 153 is rotatably connected to a front end of the supporting rod 151.

In this case, the roller 153 may be rotatably mounted at the front end of the supporting rod 151 to be in rolling contact with the material coil 10 to operate with the material coil 10 interposed between the lower left and right dies 120, and determines a length of the inclined portion 11 on the material coil 10, so that the leg portion 15 connected to the inclined portion 11 may be formed.

Finally, the first forming machine 100 includes the cutting part 160.

The cutting part 160 may be installed at a rear side of a direction in which the material coil 10 is supplied to the first forming machine 100.

The cutting part 160 includes a cutting die 161 and a cutter 163.

The cutter 163 is mounted to be vertically driven at an upper side corresponding to the cutting die 161.

The cutter 163 may be mounted to be vertically driven by an operation of a fifth motor M5 or cylinder.

When the material coil 10 is supplied to the first forming machine 100 by a predetermined length, the cutting part 160 may move the cutter 163 downward to cut the material coil 10.

In this case, the cutter 163 is installed to cut the material coil 10 corresponding to a front end of the cutting die 161.

The cutting part 160 may move in a direction closer to or farther from the frame F.

That is, the cutting part is configured to move through a fixed block B, and may be moved through a sixth motor M6 connected to the fixed block B.

Figure 4:
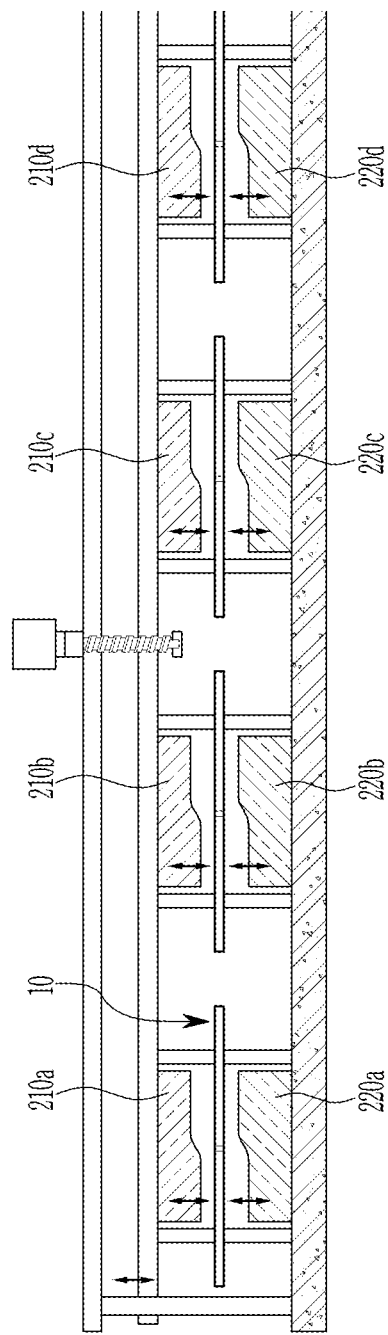
FIG. 4 and FIG. 5 illustrate schematic views of a second forming machine applied to a hairpin type of stator coil forming apparatus according to an embodiment of the present invention.
Figure 5:
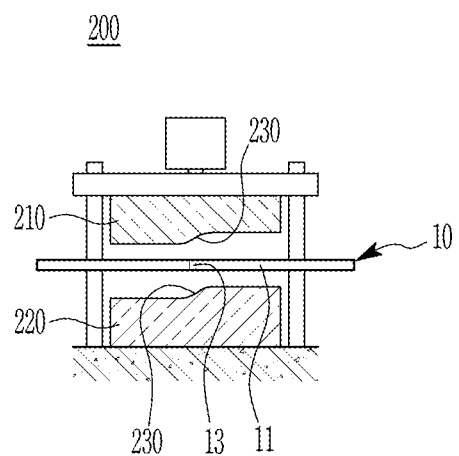

FIG. 4 and FIG. 5 illustrate schematic views of a second forming machine applied to a hairpin type of stator coil forming apparatus according to an embodiment of the present invention.

Referring to FIG. 4, the second forming machine 200 includes an upper mold 210 and a lower mold 220, and it may be configured in plural according to a shape of a stepped surface 230 formed on an inner surface of each of the upper mold 210 and the lower mold 220.

For example, the shape of the front/rear bent portion 17 varies according to the shape of the stepped surface 230 of the second forming machine 200, and correspondingly, upper molds (210a, 210b, 210c, 210d, . . . ) and lower molds (220a, 220b, 220c, 220d, . . . ) having different shapes may be disposed in plural, thus a forming process is possible if necessary.

Referring to FIG. 5, the material coil 10 loaded in the second forming machine may be loaded with the inclined portion 11 and the vertex 13 lying horizontally so that they face forward.

The stepped surface 230 is formed on each of inner surfaces of the upper mold 210 and the lower mold 220 facing each other.

The second forming machine 200 is configured so that the vertex 13 of the material coil 10 corresponds to the stepped surface 230 of each of the upper mold 210 and the lower mold 220.

The second forming machine 200 is for forming the material coil 10 so that one inclined portion and the other inclined portion 11 are positioned on different lines based on the vertex 13 of the material coil 10. That is, the second forming machine 200 is an apparatus for forming the bent portion 17 by bending and forming portions of the one inclined portion and the other inclined portion 11.

That is, the second forming machine 200 may bend and form the vertex 13 through the stepped surface 230 to form the front and rear bent portion 17, and may form them so that the one inclined portion is positioned forward or rearward compared to the other inclined portion (see the direction of FIG. 3).

Figure 6:
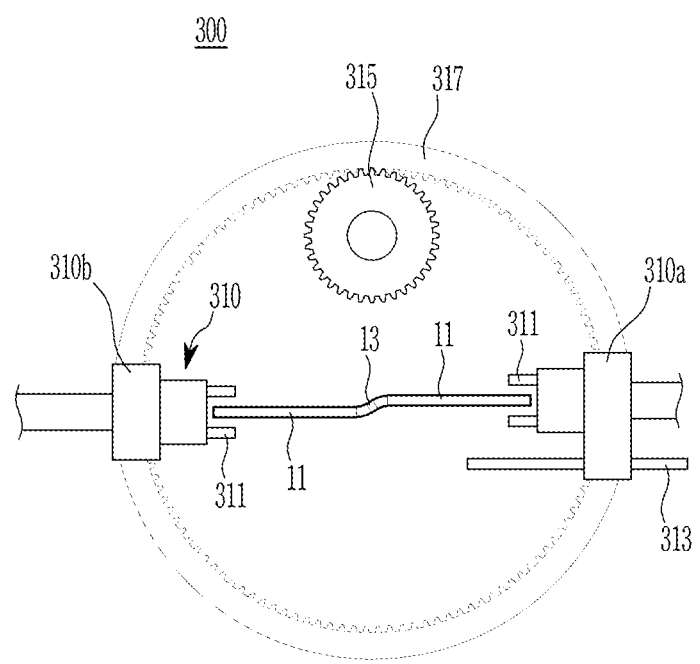
FIG. 6 illustrates a schematic view of a third forming machine applied to a hairpin type of stator coil forming apparatus according to an embodiment of the present invention.

FIG. 6 illustrates a schematic view of a third forming machine applied to a hairpin type stator coil forming apparatus according to an embodiment of the present invention.

Referring to FIG. 6, the material coil 10 may be loaded on the third forming machine 300 in a state in which the inclined portion 11 and the front/rear bent portion 17 are vertically upright.

In the present embodiment, the third forming machine 300 and the loaded material coil 10 are shown in a direction viewed from the top to help understanding of the embodiments of the invention.

The third forming machine 300 includes first and second clamping parts 310a and 310b, and both ends of the inclined portion 11 of the material coil 10 transferred from the transferring gripper are loaded to be interposed in the clamping pins 311 of respective clamping parts 310.

The clamping pins 311 may clamp the material coil 10 in the front and rear directions (see FIG. 1).

The clamping pins 311 are movable in a direction away from or towards each other by a cylinder operation.

The clamping part 310 includes the first clamping part 310a and the second clamping part 310b rotating together with a rack gear 317 rotated by a pinion gear 315.

The first clamping part 310a is configured to move forward or backward based on a center of the rack gear 317 by a guider 313 while clamping one side of the inclined portion 11.

The second clamping part 310b is configured to rotate with the rack gear 317 at the other side of the rack gear 317.

The second clamping part 310b is configured to rotate in one direction with respect to the fixed first clamping part 310a while clamping the other side of the inclined portion 11.

That is, the clamping part 310 may form the inclined portions 11 to be rounded by rotating while clamping respective ends of both inclined portions 11 of the material coil 10 through the clamping pins 311.

That is, the material coil 10 may be formed so that the inclined portion 11 may be rounded in the front and rear directions through the third forming machine 300.

Here, the clamping part 310 may set the amount of bend in the front and rear directions of the inclined portion 11 according to a rotating angle of the second clamping part 310b.

In other words, the greater the rotating angle at which the second clamping part 310b rotates with respect to the first clamping part 310a, the greater the degree in which the inclined portion 11 of the material coil 10 is bent in the front and rear directions.

Here, the transferring gripper may wait while clamping the material coil 10 until the forming process is completed in the third forming machine 300.

FIG. 7 to FIG. 15 sequentially illustrate schematic views of a forming method for forming a stator coil by using a hairpin type of stator coil forming apparatus according to an embodiment of the present invention.

The method for forming the stator coil 7 by using the first forming machine 100 as described above is as follows.

Referring to FIG. 3, the material coil 10 is supplied to the first forming machine 100 by a predetermined length in a state in which the material coil 10 is supported by the lower central die 110.

Figure 7:
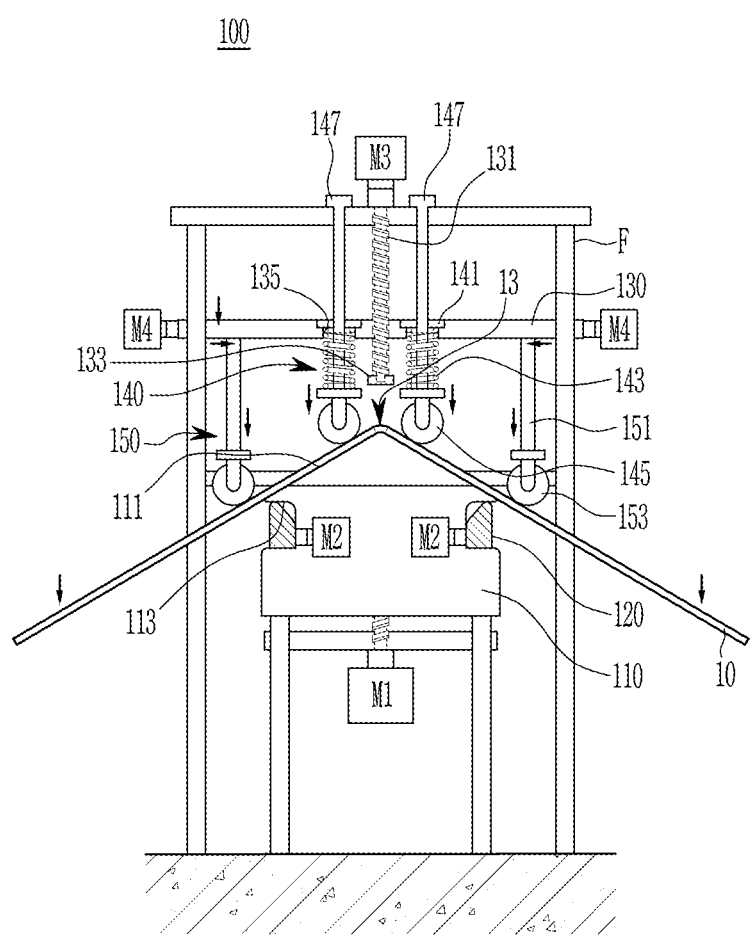
FIG. 7 to FIG. 15 illustrate schematic views of a forming method for forming a stator coil by using a hairpin type of stator coil forming apparatus according to an embodiment of the present invention.

Subsequently, referring to FIG. 7, the moving bracket 130 moves downward along the screw 131 by the operation of the third motor M3, and the upper spring part 140 press-fits the material coil to the forming surface 111 of the lower central die 110.

At the same time, the cutter 163 of the cutting part 160 is moved downward by the operation of the fifth motor M5 to cut the material coil 10. The material coil 10 may be fixed by the elastic force of the spring 143.

In this case, as the upper spring part 140 press-fits the material coil 10, the inclined portion 11 and the vertex 13 are formed on the material coil 10 along the forming surface 111 of the lower central die no.

Figure 8:
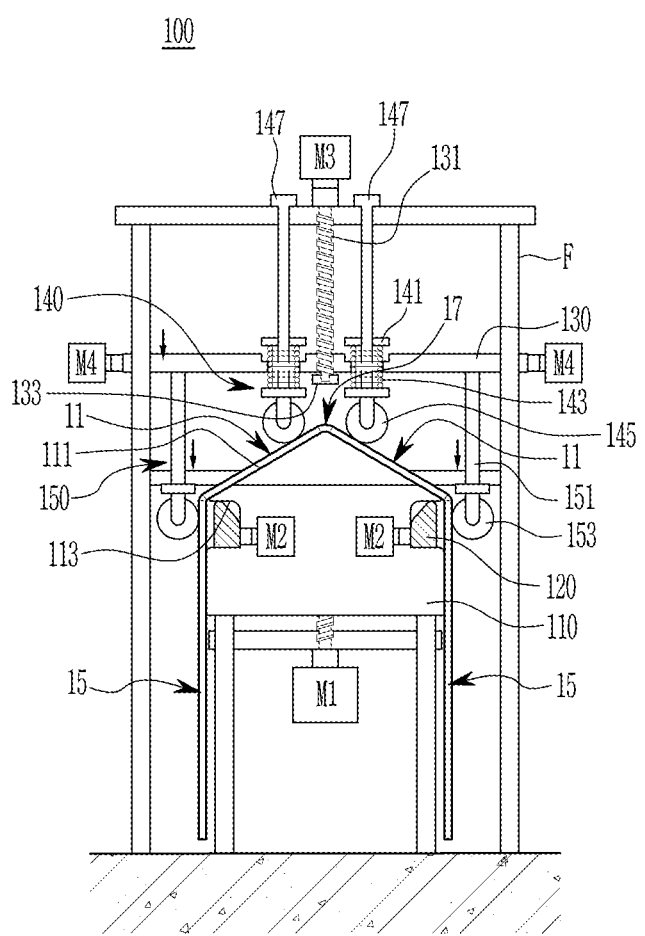

Referring to FIG. 8, the moving bracket 130 is continuously moved downward, so that the upper roller part 150 forms the leg portion 15 connected to the inclined portion 11 on the material coil 10 while press-fitting the material coil 10 based on the lower left and right dies 120.

Here, the lower left and right dies 120 are moved in the left and right directions to be loaded at a set position.

That is, the lower left and right dies 120 move in the left and right directions in the mounting grooves 113 of the lower central die 110 to adjust the length of the inclined portion 11 of the material coil 10.

Figure 9:
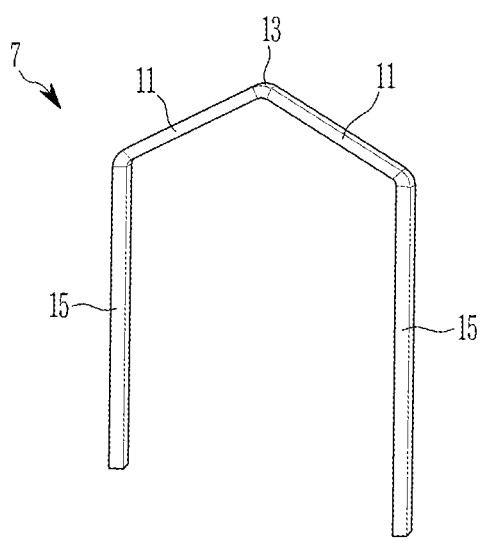

Referring to FIG. 9, the inclined portion 11, the vertex 13, and the leg portions 15 are bent and formed on the material coil 10 by the first forming machine 100 as described above, and the material coil 10 is transferred to the second forming machine 200 through a transferring gripper (not shown).

Referring to FIG. 4, the material coil 10 is loaded so that the inclined portion 11 and the vertex 13 of the material coil 10 correspond between the upper mold 210 and the lower mold 220 of the second forming machine 200, and more specifically, so that the vertex 13 corresponds to respective step surfaces 230 of the upper mold 210 and the lower mold 220.

Figure 10:
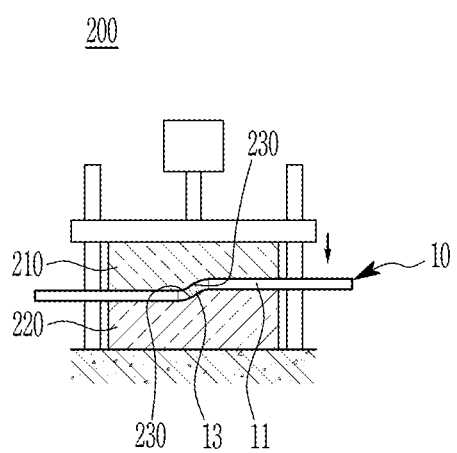

Referring to FIG. 10, the upper mold 210 and the lower mold 220 are combined to bend the vertex 13 of the material coil 10 through the stepped surface 230.

That is, the front/rear bent portion 17 is formed by bending the vertex 13 so that one of the one inclined portion 11 and the other inclined portion 11 is positioned forward or rearward so that the one inclined portion and the other inclined portion are positioned on different lines, based on the vertex 13 of the material coil 10.

In this case, the transferring gripper may wait while clamping the material coil 10 until the forming process is completed in the second forming machine 200.

Figure 11:
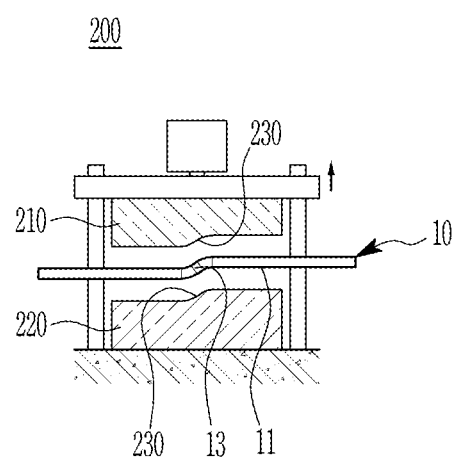

Referring to FIG. 11, next, the upper mold 210 and the lower mold 220 are separated.

The upper mold 210 and the lower mold 220 may be manufactured in a small size corresponding to the size of the material coil 10, and may be configured to be automatically replaceable whenever necessary by including various types of upper molds 210 and lower molds 220.

Figure 12:
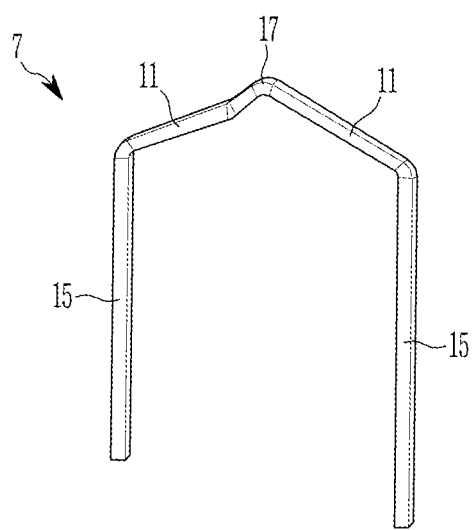

Referring to FIG. 12, the front/rear bent portion 17 is formed on the material coil 10 by the second forming machine 200 as described above, and then, the material coil 10 is transferred to the third forming machine 300 through a transferring gripper (not shown).

Referring to FIG. 5, the material coil 10 is loaded so that the front/rear bent portion 17 of the material coil 10 corresponds between the clamping pins 311 of the third machine 300.

Figure 13:
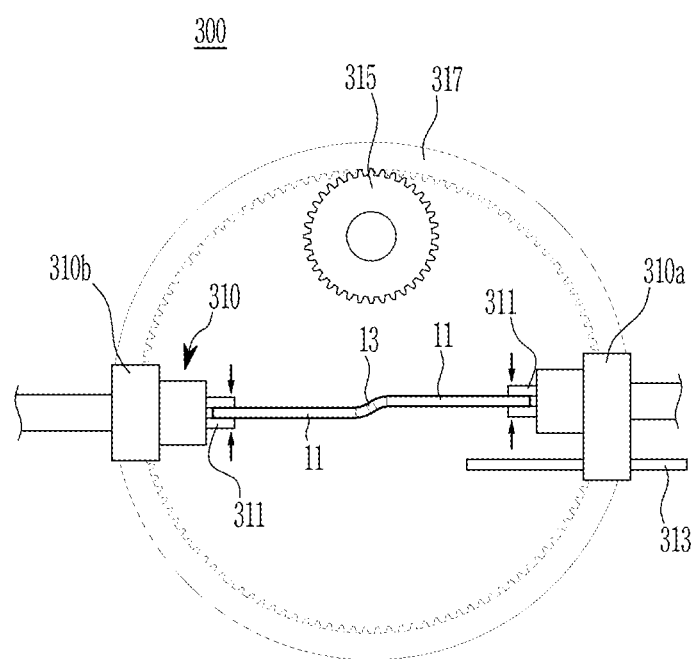

Referring to FIG. 13, the clamping pins 311 move in a direction towards each other to clamp each end of the inclined portion 11 of the material coil 10.

Figure 14:
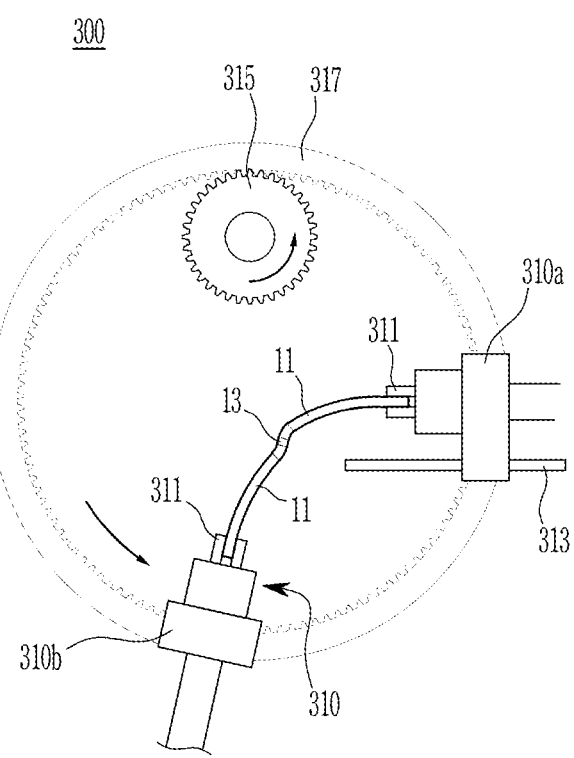

Referring to FIG. 14, as the second clamping part 310b rotates with the rack gear 317, a relative angle between the second clamping part 310b and the first clamping part 310a is changed.

Accordingly, the inclined portion 11 is rounded in the front and rear directions.

Figure 15:
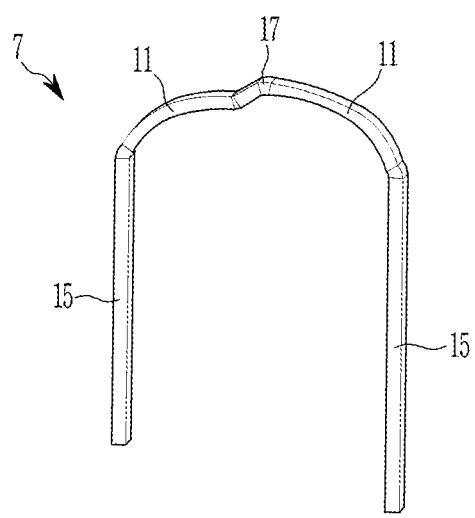

Referring to FIG. 15, the inclined portion 11 of the material coil 10 is roundly formed in the front and rear directions by the third forming machine 300 as described above to finally complete the stator coil 7.

Since the hairpin type of stator coil forming apparatus and forming method according to the embodiments of the present invention may set the length of the inclined portion 11, the angle of the vertex 13 between the inclined portions 11, the bent degree of the inclined portion 11, and the like by the first forming machine 100, the second forming machine 200, and the third forming machine 300, the stator coils having various shapes may be formed.

For example, the length of the inclined portion 11 and the angle of the vertex 13 may be adjusted by adjusting the positions of the lower left and right dies 120 of the first forming machine 100 in the left and right directions, it is possible to adjust the bent degree of the front/rear bent portion 17 by changing the design of the step surfaces 230 of the upper mold 210 and the lower mold 220 of the second forming machine 200, and the bent degree of the inclined portion 11 may be set by adjusting the rotating angle of the clamping part 310 of the third forming machine 300.

In addition, since the hairpin type of stator coil forming apparatus and forming method according to the embodiments of the present invention may change the shape of the manufactured stator coil by changing only the set values inputted to the first forming machine 100, the second forming machine 200, and the third forming machine 300, it is possible to improve productivity.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:
1. An apparatus comprising:
 a first forming machine configured to:
  form a vertex in a material coil so that a central portion of the material coil protrudes upward, and
  form inclined portions inclined to both sides of the vertex;
 a second forming machine configured to:

receive a material coil bent-formed by the first forming machine, and form a bent portion in the material coil by bending one inclined portion and a portion of the other inclined portion at and around the vertex; and a third forming machine configured to:

receive the material coil bent-formed by the second forming machine, and round the inclined portions in front and rear directions, wherein the first forming machine includes:

a lower central die comprising a forming surface having a triangular cross-section, lower left and right dies configured to be slide-movable in left and right directions at sides connected to the forming surface of the lower central die thereby define a length of the inclined portions of the material coil, a moving bracket supported by a frame at an upper portion of the lower central die, the moving bracket configured to be movable upward and downward from an upper portion of the frame, upper spring parts spaced apart from each other by a predetermined distance at sides of a center of the forming surface of the lower central die supported by the moving bracket and configured to press-fit the material coil on the lower central die so that the vertex and the inclined portions are formed, and upper roller pails disposed at both outer sides of the upper spring part and supported by the moving bracket, the upper roller parts configured to define the length of the inclined portions by press-fitting the material coil based on the lower left and right dies.

2. The apparatus of claim 1, wherein the lower central die includes an upper portion comprising the forming surface for forming the inclined portions and the vertex, and wherein sides of the upper portion comprising mounting grooves on which the lower left and right dies are mounted.

3. The apparatus of claim 2, wherein motors are configured to slidably move the lower left and right dies mounted on the mounting grooves in left and right directions.

4. The apparatus of claim 1, wherein the moving bracket is mounted on a screw configured to be rotated by a motor installed in the frame, wherein the moving bracket is movable in up and down directions, and wherein a stopper located in a lower portion of the screw is configured to limit a moving position of the moving bracket.

5. The apparatus of claim 1, wherein the upper spring part includes:

a spring mounted in a catching hole formed on the moving bracket;

a spring rod disposed inside the spring and fixed to an upper portion of the frame; and a spring block connected to an end of the spring rod and configured to press-fit the material coil toward the lower central die when the moving bracket moves downward.

6. The apparatus of claim 1, wherein the upper roller part includes:

a supporting rod mounted on the moving bracket; and a roller rotatably mounted on a front end of the supporting rod and configured to bend and press-fit the material coil toward the lower left and right dies when the moving bracket moves downward.

7. The apparatus of claim 1, wherein the first forming machine further includes a cutting part configured to cut the material coil by a set length in a rear direction in which the material coil is supplied, and wherein the cutting part includes:

a cutting die disposed under the material coil; and a cutter disposed at an upper side corresponding to the cutting die and configured to be driven in up and down directions.

8. The apparatus of claim 1, wherein the second forming machine includes:

upper and lower molds in which the vertex and the inclined portions of the material coil formed by the first forming machine are interposed; and step surfaces formed on opposite inner surfaces of the upper and lower molds and configured to form the bent portion by forming the vertex so that the inclined portions are positioned on different lines based at and around the vertex of the material coil, respectively.

9. The apparatus of claim 1, wherein the third forming machine includes clamping parts disposed respectively corresponding to both ends of the inclined portion of the material coil formed by the second forming machine so that the inclined portion is clamped by a clamping pin.

10. The apparatus of claim 9, wherein the clamping parts include:

a first clamping part configured to be movable forward and backward based on a center of a rack gear by a guider while clamping one of the inclined portions; and a second clamping part that is mounted so as to rotate with the rack gear rotating by a pinion gear and configured to rotate in one direction with respect to the first clamping part while clamping the other side of the inclined portion.

11. The apparatus of claim 10, wherein the clamping parts are configured so that the material coil rotates in a clamped state by the clamping pin to adjust a rotating angle of the inclined surface.

* * * * *

UNITED STATES PATENT AND TRADEMARK OFFICE
CERTIFICATE OF CORRECTION

PATENT NO. : 11,496,028 B2
APPLICATION NO. : 16/896023
DATED : November 8, 2022
INVENTOR(S) : Seungkyu Jang It is certified that error appears in the above-identified patent and that said Letters Patent is hereby corrected as shown below:

In the Claims

Claim 1, Column 13, Line 28; delete "pails" and insert --parts--.

Signed and Sealed this
Twentieth Day of December, 2022

Katherine Kelly Vidal
*Director of the United States Patent and Trademark Office*